Feb. 14, 1950   H. M. KESTERTON   2,497,361
ROLLER TYPE FRICTION CLUTCH
Filed Sept. 13, 1945
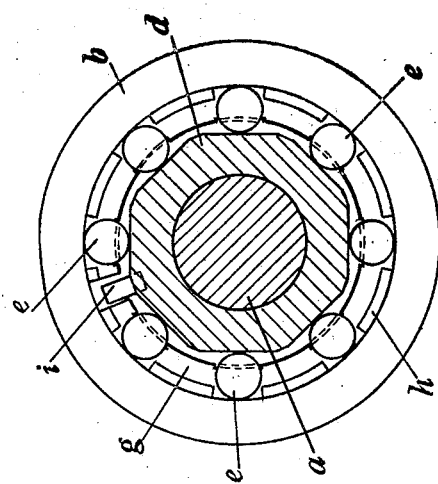
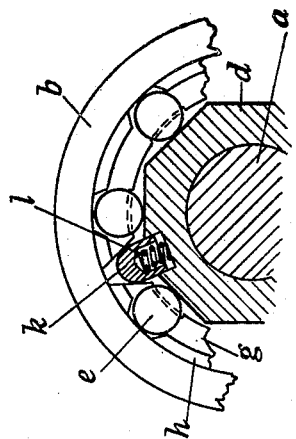
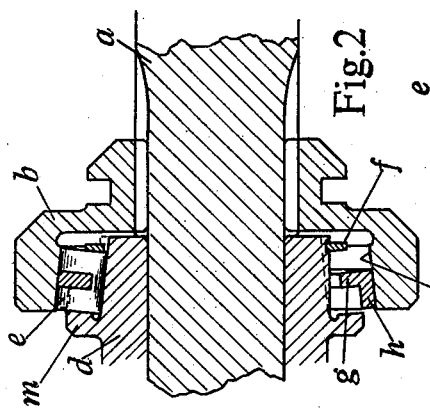
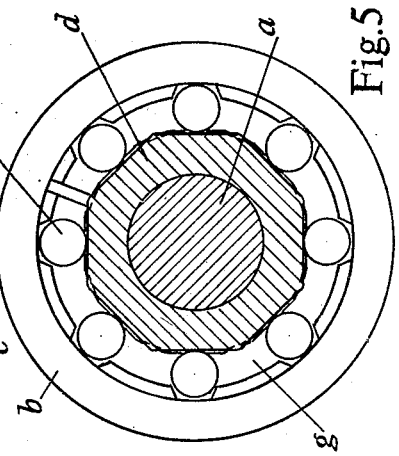
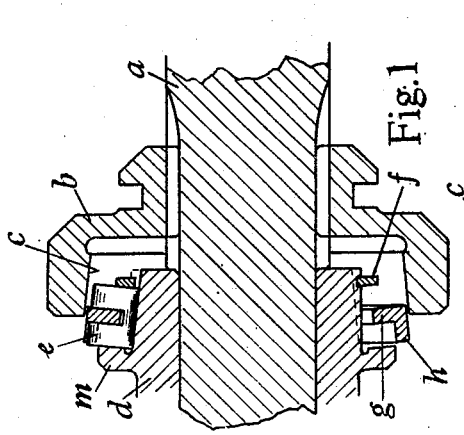
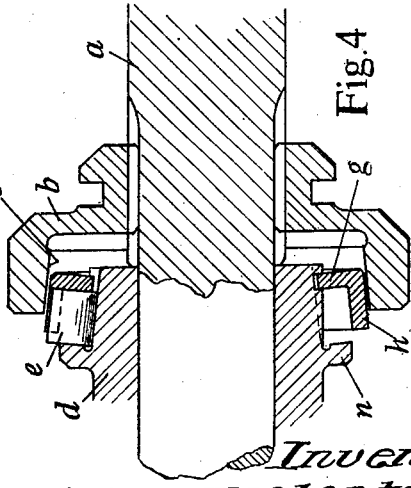
Inventor
H. M. Kesterton
By Haseltine Downing Leibel
Attys Patented Feb. 14, 1950

2,497,361

UNITED STATES PATENT OFFICE 2,497,361

ROLLER TYPE FRICTION CLUTCH

Henry Martin Kesterton, Wroxall, near Warwick, England

Application September 13, 1945, Serial No. 616,014
In Great Britain November 17, 1944

4 Claims. (Cl. 192—44)

1

This invention relates to friction clutches of the type comprising an outer annular member having a tapered inner peripheral surface of circular form, an inner member having a correspondingly tapered outer peripheral surface of polygonal form, rollers or other wedging means between the said surfaces, and a cage for retaining the wedging means in position.

The object of the invention is to provide an improved construction enabling smooth action of the clutch to be obtained in a simple and satisfactory manner.

The invention comprises a clutch of the type aforesaid having in combination with the wedging means, a resilient cage adapted to effect frictional engagement with the outer member before the wedging means come into action, and to oppose the centrifugal forces associated with the wedging means as well as to retain the latter in position.

In the accompanying sheets of explanatory drawings—

Figures 1 and 2 are sectional side elevations respectively showing in the inoperative and operative positions a clutch embodying the invention.

Figure 3 being a sectional end elevation.

Figures 4 and 5 are respectively sectional side and end elevations corresponding to Figures 1 and 3 and illustrating a modified form of my invention.

Figure 6 is a sectional end view illustrating a modified detail applicable to either of the constructions shown in Figures 1–3, or Figures 4 and 5.

Referring to Figures 1–3, I mount on a driving shaft $a$, and in spline or feather-key connection therewith, a slidable member $b$ having an annular portion the inner peripheral surface $c$ of which is of circular form and is also tapered. Freely mounted on the same shaft is another member $d$ (which in this arrangement is the driven member), and on this member is formed a portion which enters the first member and has an outer peripheral surface of polygonal form, this surface being also tapered in a manner which is complementary to the inclination of the inner peripheral surface of the first member. On the polygonal surface of the driven member are supported the wedging means which consist of a number of rollers $e$ of cylindrical form. Alternatively wedging means of any other convenient form may be used. For example the said means may consist of metal pieces each formed with a flat at one side adapted to sit on

2 a flat portion of the polygonal surface of the driven member and rounded at the opposite side where it cooperates with the circular peripheral surface of the driving member. The wedging means are retained axially by a shoulder $m$ on the member $d$ and by a split ring $f$ sprung into a groove in the driven member at one end of the wedging means.

In accordance with my present invention I employ a cage in the form of a resilient split ring. This may be of any convenient cross section. In one convenient form it consists of a web part $g$ which lies across notches in the wedging means, and an outer peripheral flange $h$ which is gapped at intervals to allow the wedging means to make contact with the driving member. Also its inner peripheral edge is notched to locate the wedging means circumferentially.

Rotation of the cage relatively to the driven member is prevented by a stop $i$ extending from the driven member into a gap between the adjacent ends of the cage. This stop may be a plain peg secured to the driven member. Or it may consist (as shown in Figure 6) of a spring loaded wedge $k$ which has its inner end located in a cavity in the periphery of the driven member, the spring $l$ serving to press the wedge between mutually inclined ends of the cage.

Further the said resilient ring forming the above described cage has the outer periphery of the part $h$ inclined in a similar manner to the inner peripheral surface of the driving member, and the outer diameter of the ring (before contraction) is slightly larger than that of an imaginary circle drawn around and in contact with the wedging means.

The mode of action is as follows:

When the clutch is released by lateral movement of the driving member relatively to the driven member, the cage expands. When bringing the clutch into action by an opposite sliding movement of the driving member, the first effect is to establish frictional contact between the driving member and the peripheral surface $h$ of the cage, thereby reducing or eliminating relative rotation between the driving and driven members. A small further sliding movement of the driving member contracts the cage sufficiently to enable the wedging means to come into action. The cage thus enables the clutch parts to be engaged smoothly.

From the foregoing it will be seen that the cage not only promotes smooth engagement of the driving and driven parts but it also opposes the centrifugal forces associated with the wedging means when the driven member is revolving and retains the wedging means in proper positions.

The modification shown in Figures 4 and 5 is essentially similar to the construction above described, but differs in that the retaining ring $f$ is dispensed with, and instead the inner periphery of the web part $g$ of the cage is engaged with a groove in the driven member, so that the cage serves the same purpose as the ring $f$ as well as its other function above described. Also the inner periphery of the web part $g$ is made of polygonal form, so that it cannot rotate relatively to the driven member on which it is mounted. Further the wedging means consist of plain rollers, the part $h$ of the cage being gapped to allow the rollers to make contact with the driving member when the latter is moved to its operative position.

The invention is not, however, restricted to the example above described, as subordinate details may be modified to suit different requirements, and the parts herein described as the driving and driven members may be adapted to act as driven and driving members.

Having thus described my invention, what I claim as new and desire to secure by Letters Patent is:

1. A friction clutch comprising in combination a rotatable outer annular member having a tapered inner peripheral surface of circular form, an inner rotatable member having a correspondingly tapered outer peripheral surface of polygonal form, one of the two members being slidable axially with respect to the other, wedging members situated in spaced relationship on the polygonal outer peripheral surface of the inner member so that they can serve when brought by relative sliding movement of the inner and outer members into frictional contact with the inner peripheral surface of the outer member to transmit rotary motion between this member and the inner member, and a radially resilient cage of annular form mounted on the inner member and serving to retain the wedging members in position and to oppose centrifugal forces acting on the wedging members, the resilient cage being arranged to project circumferentially beyond the wedging members when the latter are out of contact with the inner peripheral surface of the outer member, so that when the clutch is brought into action the cage effects frictional engagement with the outer member before the wedging members, and is then contracted by the outer member to allow frictional contact between the outer and wedging members.

2. A friction clutch as claimed in claim 1, in which the cage consists of a web part engaging notches in the wedging members, and a peripheral flange extending laterally from the web part, the flange being gapped to accommodate the wedging members.

3. A friction clutch as claimed in claim 1, in which the cage consists of a web part engaging a groove in the inner rotatable member, and a peripheral flange extending laterally from the web part, the flange being gapped to accommodate the wedging members.

4. A friction clutch as claimed in claim 1, and having a spring loaded wedge piece mounted on the inner member between the sides of a split in the cage.

HENRY MARTIN KESTERTON.

REFERENCES CITED

The following references are of record in the file of this patent:

UNITED STATES PATENTS

| Number | Name | Date |
| --- | --- | --- |
| 1,782,605 | Farley | Nov. 25, 1930 |
| 2,113,512 | Kesterton | Apr. 5, 1938 |
| 2,293,095 | Anderson | Aug. 18, 1942 |

FOREIGN PATENTS

| Number | Country | Date |
| --- | --- | --- |
| 311,860 | Italy | Oct. 13, 1933 |
| 331,508 | Great Britain | July 2, 1930 |